UNITED STATES PATENT OFFICE.

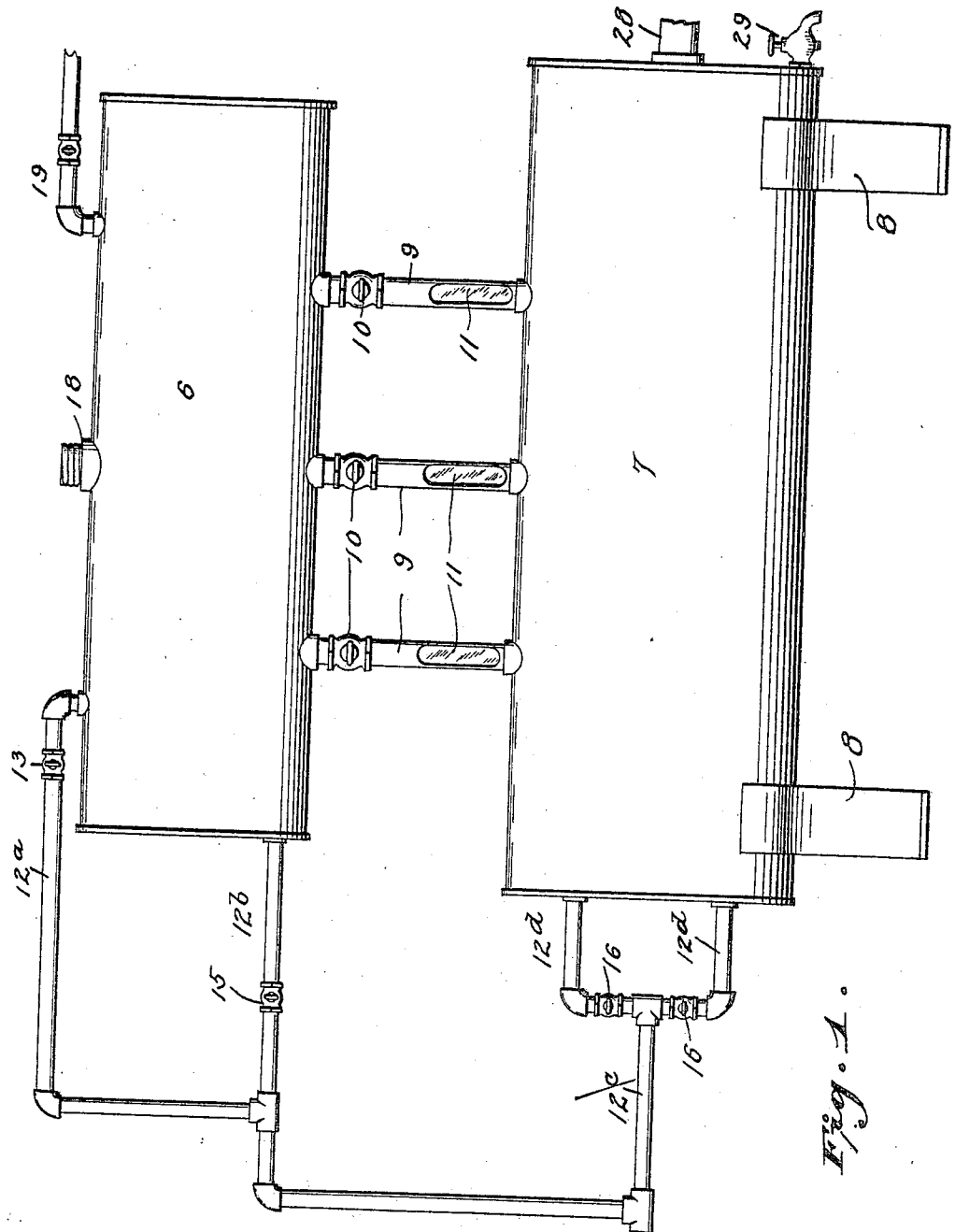

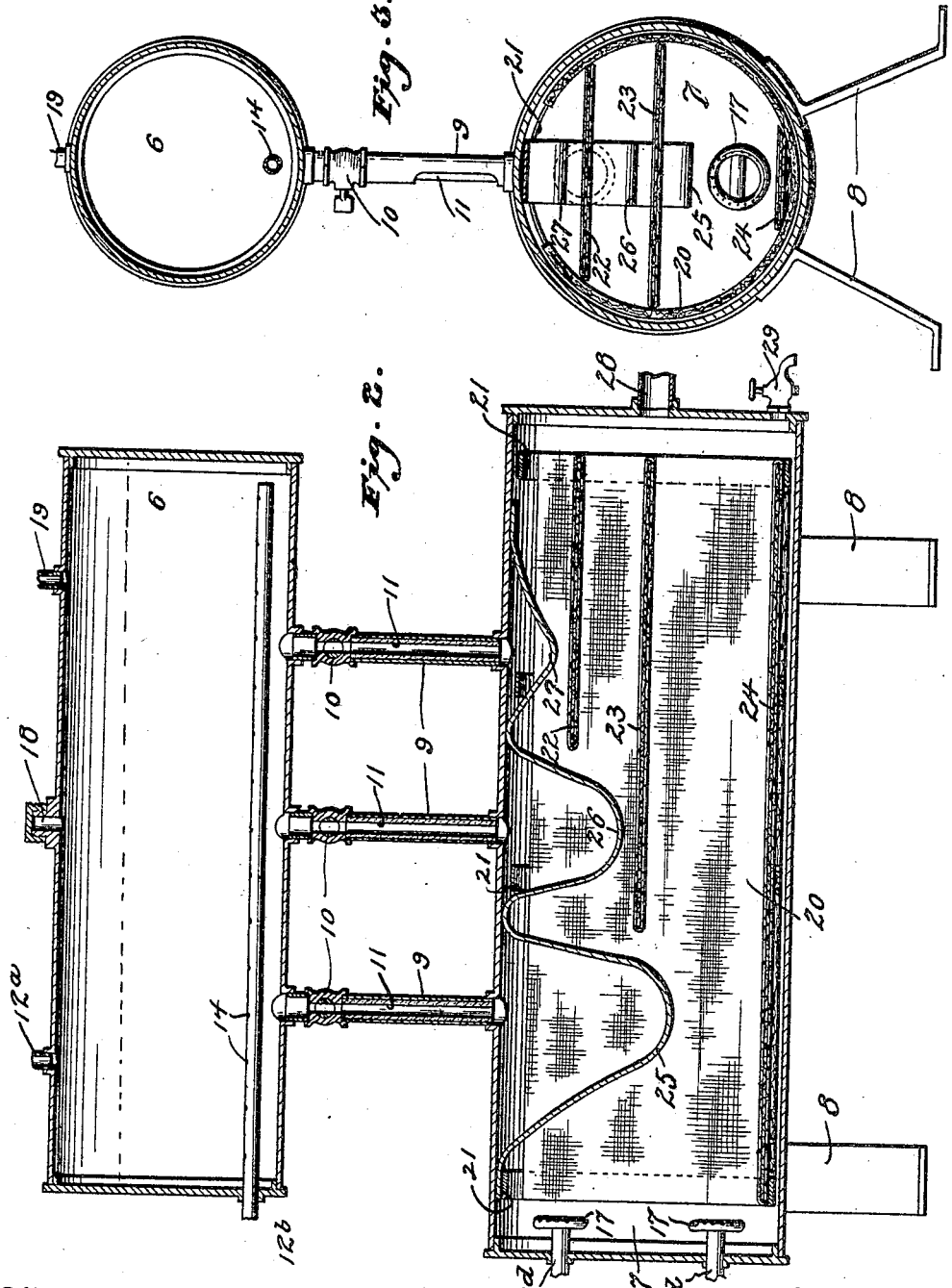

ELDER E. SHIESS, OF NEWPORT, ARKANSAS.

CARBURETER.

No. 817,592.  Specification of Letters Patent.  Patented April 10, 1906.

Application filed August 7, 1905. Serial No. 273,164.

*To all whom it may concern:*

Be it known that I, ELDER E. SHIESS, a citizen of the United States, residing at Newport, in the county of Jackson and State of Arkansas, have invented new and useful Improvements in Carbureters, of which the following is a specification.

This invention is a carbureter particularly adapted for use for supplying lamps or stoves with vapor.

The object of the invention is to form an improved device of the kind, as will more fully appear from the following description and the drawings.

A particular feature is an adaptability for supplying either lamps or a stove. For the former a capillary vaporizer is employed. For the latter the air is charged by being sprayed through the oil in the tank. The feed of the oil from the tank to the carbureting-chamber is effected by air-pressure and a flow of air through the chamber is effected by the same means.

In the accompanying drawings, Figure 1 is a side elevation of the device. Fig. 2 is a central longitudinal section. Fig. 3 is a vertical cross-section.

Referring specifically to the drawings, 6 indicates the oil-tank, and 7 the carbureting-chamber. These are horizontally arranged, the former above the latter, and conveniently comprise sheet-metal cylinders closed at both ends. The carbureting-chamber stands upon legs 8.

The tank 6 is connected to the carbureting-chamber by a plurality of feed-pipes 9, which have valves 10 and sight-glasses 11. The valves enable the feed to be regulated or cut off, and the sight-glasses permit the rate of feed to be seen. Three of these feed-pipes are shown in the drawings arranged in a row lengthwise on top of the carbureting-chamber.

An air-supply pipe is indicated at 12, leading from a suitable pump or source of air-pressure. This conducts the air to the various parts of the device by means of branches, as follows: One branch $12^a$ leads into the top of the tank 6 and has a valve 13. Another branch $12^b$ leads into the bottom of the tank 6 and extends along within the same and is provided therein with a series of jet-holes 14, through which air may be sprayed up through the oil in the tank. The pipe $12^b$ has a valve 15, controlling the same. The branch $12^c$, which also leads from the pipe 12, divides into two pipes $12^d$, which extend into the head of the carbureting-cylinder in the upper and lower parts thereof, respectively. Each of these branches $12^d$ is controlled by valve 16 and terminates within the cylinder in a spraying-ring 17, provided with a plurality of fine holes, so that the air is distributed in the cylinder as it is forced therein. The tank 6 has a filling-hole 18 and also has in the top thereof an outlet-pipe 19, which may be connected to a stove by a suitable pipe or tube. The circular wall of the cylinder 7 is lined with a covering of capillary material at 20. This layer may conveniently be made of one or more thicknesses of flannel or the like. It is stetched and supported upon a series of rings 21, which fit within the cylinder. These rings also support horizontal transverse sheets of capillary material, such as padded flannel or cloth, which extend across the cylinder. These sheets do not extend the full length of the cylinder. The upper one, 22, is located near the top of the cylinder and is comparatively short. Below this is another, 23, of greater length, and at the bottom is a thick pad or layer 24, which extends the full length. Located in the upper part of the cylinder directly under the outlets from the feed-pipes 9 is a splasher consisting of a metal ribbon extending lengthwise of the cylinder and an inch or two wide. This ribbon is bent to form a series of downwardly-curved portions which are respectively adapted to receive the jet or flow from each of the pipes and to splash the stream on the respective capillary sheets. Thus the first bend (indicated at 25) dips low and the stream falling thereon from the first pipe 9 is splashed onto the sheet 24 and the surrounding parts of the lining 20. The next bend 26 is located above the transverse sheet 23, and the stream from the second pipe falling thereon is splashed and spread upon said sheet, and similarly with the next bend 27, which is located above the upper sheet 22. The outlet-pipe from the cylinder 7 is indicated at 28, and it also has a drip or waste cock 29.

In the operation of the device for supplying lamps with gas the valve 13 is first opened and a pressure is pumped up in the tank 6. The valves 10 are then opened to a slight extent which allows three streams of oil to flow down through the pipes 9 into the carbureting-chamber, where they strike the splasher, and the oil is thus sprayed onto the capillary material. The valves 16 are then opened and the air is forced through the carbureter and out through the pipe 28 to service. If and when it be desired to use the generator for a gas-stove, which requires a vapor of different richness than a lamp, the valve 15 is opened and the air is sprayed through the openings 14, and passing up through the oil in the tank becomes charged and may then be supplied through the pipe 19 to the stove.

Having thus described my invention, what is claimed as new, and desired to be secured by Letters Patent, is—

1. A carbureter comprising an oil-tank, a horizontal carbureting-cylinder thereunder, containing a lining of capillary material and a series of horizontal transverse sheets of similar material, a series of pipes leading from the tank into the top of the cylinder, a splasher under each pipe, arranged to distribute the oil therefrom to a different sheet, and inlet and outlet pipes in opposite ends of the cylinder.

2. In a carbureter, the combination with a tank, a carbureting-chamber, and a series of feed-pipes connecting the same, of a series of capillary sheets extending across the chamber at different heights and located under the respective pipes, and a splasher arranged under each pipe and arranged to distribute oil therefrom onto each sheet respectively.

In testimony whereof I have signed my name to this specification in the presence of two subscribing witnesses.

ELDER E. SHIESS.

Witnesses:
 HARRY BORN,
 M. BAILEY.